US010642325B2

(12) United States Patent
Worthington et al.

(10) Patent No.: US 10,642,325 B2
(45) Date of Patent: May 5, 2020

(54) IMPLEMENTING THERMAL REMEDIATIONS IN REACTION TO EXECUTION OF SOFTWARE

(71) Applicant: Microsoft Technology Licensing, LLC, Redmond, WA (US)

(72) Inventors: Bruce Lee Worthington, Redmond, WA (US); Tristan A. Brown, Bellevue, WA (US); Iulian Doroftei Calinov, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1300 days.

(21) Appl. No.: 14/699,964

(22) Filed: Apr. 29, 2015

(65) Prior Publication Data

US 2016/0224081 A1 Aug. 4, 2016

Related U.S. Application Data

(60) Provisional application No. 62/110,238, filed on Jan. 30, 2015.

(51) Int. Cl.
*G06F 1/20* (2006.01)
*G06F 11/30* (2006.01)
(Continued)

(52) U.S. Cl.
CPC ............ *G06F 1/206* (2013.01); *G06F 9/5094* (2013.01); *G06F 11/3024* (2013.01);
(Continued)

(58) Field of Classification Search
CPC .. G06F 1/206; G06F 11/3024; G06F 11/3058; G06F 11/3452; G06N 5/02; H04W 52/0258
See application file for complete search history.

(56) References Cited

U.S. PATENT DOCUMENTS 6,198,245 B1 3/2001 Du et al.
6,415,388 B1 * 7/2002 Browning ............... G06F 1/206
713/322

(Continued)

FOREIGN PATENT DOCUMENTS

CN 102084318 A 6/2011
WO 2009158683 A2 12/2009

OTHER PUBLICATIONS

International Search Report and Written Opinion for PCT Application No. PCT/US2016/013504, dated Aug. 1, 2016.
(Continued)

*Primary Examiner* — Alexey Shmatov
*Assistant Examiner* — Robert Bejcek, II
(74) *Attorney, Agent, or Firm* — Workman Nydegger

(57) ABSTRACT

Embodiments are directed to capturing and storing historical data regarding thermal remediations, to predicting and acting on remediation futures and to communicating with applications regarding thermal remediations implemented on the computer system. In one scenario, a computer system determines which thermal remediations are currently being implemented on a monitored computing device. The thermal remediations are based on the monitored computing device's current operating environment including the physical thermal environment and/or the current software execution environment. The computer system further tracks thermal remediation levels for those thermal remediations that are currently being implemented on the monitored computing device, the thermal remediation levels indicating the degree to which each thermal remediation is implemented. The computer system also filters the tracked thermal remediation levels for tracked thermal remediation information that includes information regarding the computing device's cur-
(Continued)

rent operating environment, and stores the filtered thermal remediation levels in a data store.

20 Claims, 6 Drawing Sheets

(51) Int. Cl.
G06F 9/50 (2006.01)
H04W 52/02 (2009.01)
G06F 11/34 (2006.01)
G06N 5/02 (2006.01)
G06F 1/3206 (2019.01)
G06F 1/3234 (2019.01)

(52) U.S. Cl.
CPC ...... *G06F 11/3058* (2013.01); *G06F 11/3452* (2013.01); *G06N 5/02* (2013.01); *H04W 52/0258* (2013.01); *G06F 1/3206* (2013.01); *G06F 1/3234* (2013.01); *G06F 11/3062* (2013.01); *G06F 11/34* (2013.01); *Y02D 70/00* (2018.01); *Y02D 70/142* (2018.01); *Y02D 70/144* (2018.01); *Y02D 70/164* (2018.01); *Y02D 70/168* (2018.01); *Y02D 70/26* (2018.01)

(56) References Cited

U.S. PATENT DOCUMENTS

| | | | |
|---|---|---|---|
| 6,470,289 B1 * | 10/2002 | Peters | G01K 7/42 |
| | | | 702/132 |
| 6,996,441 B1 | 2/2006 | Tobias | |
| 7,072,805 B2 | 7/2006 | Cascaval et al. | |
| 7,748,895 B2 | 7/2010 | Sri-Jayantha et al. | |
| 7,770,176 B2 | 8/2010 | Maeda et al. | |
| 7,793,291 B2 | 9/2010 | Arai et al. | |
| 8,304,698 B1 * | 11/2012 | Tischler | G06F 1/206 |
| | | | 219/497 |
| 8,706,314 B2 | 4/2014 | Lewis et al. | |
| 2005/0288886 A1 | 12/2005 | Therien et al. | |
| 2006/0174146 A1 | 8/2006 | Prosperi et al. | |
| 2007/0008887 A1 | 1/2007 | Gorbatov et al. | |
| 2007/0124618 A1 * | 5/2007 | Aguilar, Jr. | G06F 1/206 |
| | | | 713/322 |
| 2009/0049314 A1 * | 2/2009 | Taha | G06F 1/3203 |
| | | | 713/300 |
| 2009/0228726 A1 | 9/2009 | Malik et al. | |
| 2013/0046999 A1 | 2/2013 | Jung | |
| 2013/0096720 A1 | 4/2013 | Brey et al. | |
| 2013/0166241 A1 | 6/2013 | Hamann et al. | |

OTHER PUBLICATIONS

International Preliminary Report on Patentability issued in PCT Application No. PCT/US2016/013504 dated Apr. 11, 2017.
"Second Written Opinion Issued in PCT Application No. PCT/US2016/013504", dated Dec. 7, 2016, 12 Pages.
Yeo, et al., "Predictive Dynamic Thermal Management for Multicore Systems", In Proceedings of 45th ACM/IEEE Design Automation Conference, Jun. 8, 2008, pp. 734-739.
Ambrose, Jude Angelo, "HEATSMART: An Interactive Application Aware Thermal Management Framework for MPSoC Embedded Systems", In Proceedings of 6th International Conference on Industrial and Information Systems, Aug. 16, 2011, pp. 54-59.
"Freescale Energy-Efficient Solutions: Enabling a New Generation of Applications", In Whitepaper of Freescale, Aug. 21, 2014, 18 pages.
Srinivasan, et al., "Predictive Dynamic Thermal Management for Multimedia Applications", In Proceedings of 17th International Conference on Supercomputing, Jun. 23, 2003, 12 pages.
Xie, et al., "Dynamic Thermal Management in Mobile Devices Considering the Thermal Coupling Between Battery and Application Processor", In Proceedings of the International Conference on Computer-Aided Design, Nov. 2013, pp. 242-247.
Cattaneo, Riccardo, "ADAPTME: Operating System Support for Adaptive Performance and Thermal Management", In Thesis for the degree of Master of Science in Computer Science, Retrieved on: Jan. 29, 2015, 97 pages.
Yun, et al., "Predicting Thermal Behavior for Temperature Management in Time-Critical Multicore Systems", In Proceedings of the IEEE 19th Real-Time and Embedded Technology and Applications Symposium, Apr. 9, 2013, 10 pages.
"First Office Action and Search Report Issued in Chinese Patent Application No. 201680007824.9", dated Jul. 1, 2019, 26 Pages.

* cited by examiner

Thermal Remediations — 601

| Remediation Type — 602 | Level Of Implementation (1 - 10) — 603 |
|---|---|
| Reducing CPU Clock Frequencies | 8 |
| Moving Work Items Between CPU Cores | 6 |
| Display Dimming | 3 |
| Preventing Battery From Charging | 7 |
| Reducing Data Transmission Rates | 1 |
| Disabling Antennas | 1 |
| Disabling Ports | 3 |
| Reducing Camera Frame Rates | 9 |
| Reducing Camera Resolution | 6 |
| Changing Hardware Component Or Platform Idle States | 2 |

*Figure 6*

IMPLEMENTING THERMAL REMEDIATIONS IN REACTION TO EXECUTION OF SOFTWARE

CROSS-REFERENCE TO RELATED APPLICATIONS

This application claims priority to and the benefit of U.S. Provisional Patent Application Ser. No. 62/110,238, entitled "Managing Thermal Remediations on a Computing Device, filed on Jan. 30, 2015, which application is incorporated by reference in its entirety herein.

BACKGROUND

As mobile computing devices become increasingly capable of high-level processing, their level of processing is limited by the device's ability to dissipate heat. In order to reduce the amount of heat generated by the device, a variety of different thermal remediations may be applied. These remediations may include capping CPU core frequencies, reducing screen brightness, or others. The thermal remediations are typically applied after an application has been running for period of time long enough to cause the device to reach a thermal threshold. The heating and subsequent thermal remediations negatively impact the user experience by making it less responsive, lowering frame rates, glitching, etc. Furthermore, once the device subsequently reaches a steady state (thermal equilibrium), the resultant performance may actually be worse than if the remediations had been enabled (at some lesser intensity) when the application was started.

BRIEF SUMMARY

Embodiments described herein are directed to capturing and storing historical data regarding thermal remediations, predicting and acting on remediation futures and to communicating with applications regarding thermal remediations implemented on the computer system. In one embodiment, a computer system determines which thermal remediations are currently being implemented on a monitored computing device. The thermal remediations may include reducing CPU or other hardware component clock frequencies, moving work items between CPU cores, dimming a display, preventing a battery from charging, reducing transmission rates on a network card, disabling antennas, disabling ports, reducing camera frame rates, reducing camera resolution, changing hardware component or platform idle states or other remediations. The thermal remediations are based on the monitored computing device's current operating environment, which may include both the physical thermal environment and the current software execution environment.

The computer system further tracks thermal remediation levels for those thermal remediations that are currently being implemented on the monitored computing device. The thermal remediation levels indicate the degree to which each thermal remediation is implemented. The computer system also filters the tracked thermal remediation levels for those portions of tracked thermal remediation information that include information regarding the monitored computing device's current operating environment, and stores the filtered thermal remediation levels in a data store. Tracking and identifying which thermal remediations are being implemented and the degree to which they are being implemented, and then filtering the remediations to determine which are most relevant to the computing device's current operating environment may allow for changes to be implemented which conserve the life of the device and improve processing performance. Indeed, by identifying the remediations that are most relevant to the computing device's current operating environment, the level of those remediations may be increased or decreased to reduce the temperature of the device, and thereby increase processing speed and hardware component performance.

In another embodiment, a computer system predicts and acts on thermal remediation futures. The computer system determines a current operating state for a monitored computing system. The computing system determines that at least one operating state characteristic has changed on the monitored computing system. The computer system further accesses an indication of prior thermal remediation levels, which indicate the degree to which each thermal remediation was implemented. The computer system also generates a prediction of which thermal remediations will be applied in reaction to the change in operating state characteristics of the computing system, and implements the sustainable thermal remediations identified in the generated prediction.

In yet another embodiment, a computer system communicates with applications regarding thermal remediations implemented on a monitored computer system. The computer system receives hints from an application running on the monitored computer system, where the hints provide an indication of the application's future processing behavior. The computer system generates a prediction indicating which thermal remediations will be applied in reaction to the received hints indicating the application's future processing behavior, and implements the sustainable thermal remediations identified in the generated prediction. The implementation may be performed by an operating system or by hardware or firmware on the monitored computing system itself.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 6 illustrates an embodiment of a display showing thermal remediation types and their corresponding level of implementation.

DETAILED DESCRIPTION

Figure 1:
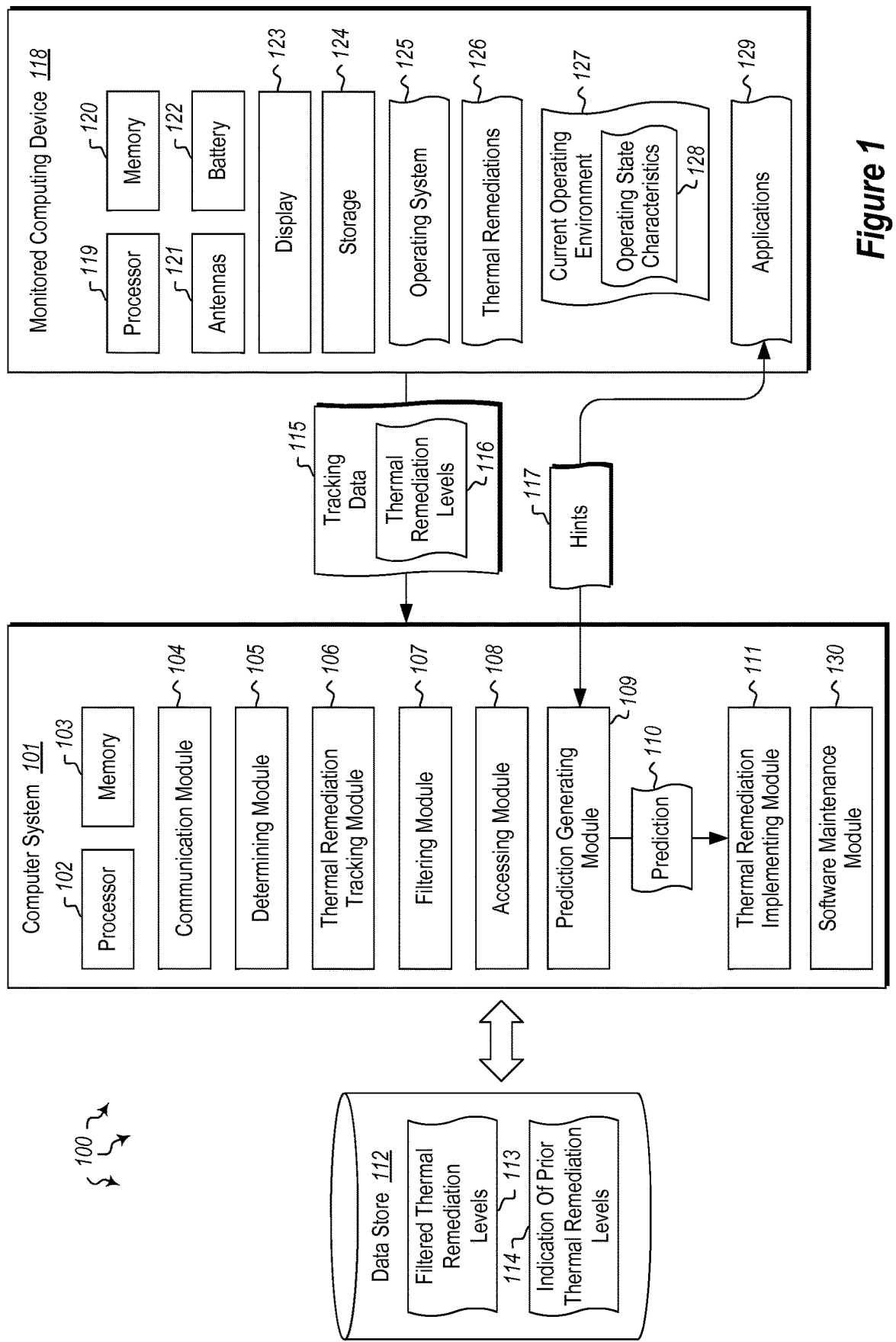
FIG. 1 illustrates a computer architecture in which embodiments described herein may operate including capturing and storing historical data regarding thermal remediations.

Embodiments described herein are directed to capturing and storing historical data regarding thermal remediations, predicting and acting on remediation futures and to communicating with applications regarding thermal remediations implemented on the computer system. It should be understood that when referring to "applications" herein, the term refers to applications or other pieces of software such as functions or methods. In one embodiment, a computer system determines which thermal remediations are currently being implemented on a monitored computing device. The thermal remediations may include reducing CPU or other hardware component clock frequencies, moving work items between CPU cores, dimming a display, preventing a battery from charging, reducing transmission rates on a network card, disabling antennas, disabling ports, reducing camera frame rates, reducing camera resolution, changing hardware component or platform idle states or other remediations. The thermal remediations are based on the monitored computing device's current operating environment, which may include both the physical thermal environment and the current software execution environment.

The computer system further tracks thermal remediation levels for those thermal remediations that are currently being implemented on the monitored computing device. The thermal remediation levels indicate the degree to which each thermal remediation is implemented. The computer system also filters the tracked thermal remediation levels for those portions of tracked thermal remediation information that include information regarding the monitored computing device's current operating environment, and stores the filtered thermal remediation levels in a data store. Tracking and identifying which thermal remediations are being implemented and the degree to which they are being implemented, and then filtering the remediations to determine which are most relevant to the computing device's current operating environment may allow for changes to be implemented which conserve the life of the device and improve processing performance. Indeed, by identifying the remediations that are most relevant to the computing device's current operating environment, the level of those remediations may be increased or decreased to reduce the temperature of the device, and thereby increase processing speed and hardware component performance.

In another embodiment, a computer system predicts and acts on remediation futures. The computer system determines a current operating state for a monitored computing system. The computing system determines that at least one operating state characteristic has changed on the monitored computing system. The computer system further accesses an indication of prior thermal remediation levels, which indicate the degree to which each thermal remediation was implemented. The computer system also generates a prediction of which thermal remediations will be applied in reaction to the change in operating state characteristics of the computing system, and implements the sustainable thermal remediations identified in the generated prediction.

In yet another embodiment, a computer system communicates with applications regarding thermal remediations implemented on a monitored computer system. The computer system receives hints from an application running on the monitored computer system, where the hints provide an indication of the application's future processing behavior. The computer system generates a prediction indicating which thermal remediations will be applied in reaction to the received hints indicating the application's future processing behavior, and implements the sustainable thermal remediations identified in the generated prediction. The implementation may be performed by an operating system or by hardware or firmware on the monitored computing system itself.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be handheld devices such as smartphones or feature phones, appliances, laptop computers, wearable devices, desktop computers, mainframes, distributed computing systems, or even devices that have not conventionally been considered a computing system. In this description and in the claims, the term "computing system" is defined broadly as including any device or system (or combination thereof) that includes at least one physical and tangible hardware processor, and a physical and tangible hardware or firmware memory capable of having thereon computer-executable instructions that may be executed by the processor. A computing system may be distributed over a network environment and may include multiple constituent computing systems.

As illustrated in FIG. 1, a computing system 101 typically includes at least one processing unit 102 and memory 103. The memory 103 may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media or computer-readable hardware storage devices that form a computer program product. An example of such an operation involves the manipulation of data. The computer-executable instructions (and the manipulated data) may be stored in the memory 103 of the computing system 101. Computing system 101 may also contain communication channels that allow the computing system 101 to communicate with other message processors over a wired or wireless network. Such communication channels may include hardware-based receivers, transmitters or transceivers, which are configured to receive data, transmit data or perform both.

Embodiments described herein may comprise or utilize a special-purpose or general-purpose computer system that includes computer hardware, such as, for example, one or more processors and system memory, as discussed in greater detail below. The system memory may be included within the overall memory 103. The system memory may also be referred to as "main memory", and includes memory locations that are addressable by the at least one processing unit 102 over a memory bus in which case the address location is asserted on the memory bus itself. System memory has been traditionally volatile, but the principles described herein also apply in circumstances in which the system memory is partially, or even fully, non-volatile.

Embodiments described herein also include physical and other computer-readable media for carrying or storing computer-executable instructions and/or data structures. Such computer-readable media can be any available media that can be accessed by a general-purpose or special-purpose computer system. Computer-readable media or storage devices that store computer-executable instructions and/or data structures are computer storage media or computer storage devices. Computer-readable media that carry computer-executable instructions and/or data structures are transmission media. Thus, by way of example, and not limitation, embodiments described herein may comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the embodiments described herein.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system 101 includes modules for performing a variety of different functions. For instance, the communications module 104 may be configured to communicate with other computing systems. The communications module 104 may include any wired or wireless communication means that can receive and/or transmit data to or from other computing systems. The communications module 104 may be configured to interact with databases, mobile computing devices (such as mobile phones or tablets), embedded or other types of computing systems.

The computer system 101 further includes other modules for performing functionality including capturing and storing historical data regarding thermal remediations, predicting and acting on remediation futures and to communicating with applications regarding thermal remediations implemented on the computer system. As mentioned above, computing systems generate heat when performing functions such as executing software, communicating with other computer systems, charging their battery, powering the display or performing other tasks. Thus, as a computer system (such as a mobile device) processes applications, charges its battery or performs other functions, the system may begin to heat up.

When a computing device overheats, whether it be a server in a datacenter, a PC, laptop, tablet, phone, wearable device, kiosk, or other device, thermal sensors may trigger one or more thermal remediations on that platform. "Thermal remediations", as the term is used herein, refers to actions that are taken to cool a device or reduce further heating of a device. On larger or AC-powered platforms, such remediations may include increasing any active cooling activity (e.g., starting or speeding up fans) which may not have an impact on the overall performance of the device. On smaller device, there may not be any active cooling remediations available, or less powerful versions of such. Accordingly, additional remediations may be implemented which may impact the overall performance of the device.

As devices typically takes some amount of time to heat up (which may be variable based on the device's current operating environment), and as thermal remediations may not be implemented until the device is already hot, there may be a discontinuity in the user-perceived performance of a platform. As indicated above, the implementation of thermal remediations may reduce operational performance on the device, which may result in a negative impression of the experience. This possibility is increased for resource-intensive or long-running applications because of their thermal ramp-up characteristics.

Furthermore, the battery life of the platform may be impacted, or the resulting steady-state performance after the remediations may actually be worse that if some lesser level of remediations had been kicked in at the start of the specific application or other software that caused the thermal threshold(s) to be reached. Furthermore, even if, in some cases, sufficient thermal remediations cannot be started when the application is started, such as to guarantee that the user experience will be consistent, engaging thermal remediations early may at increase the amount of time before the user experience degrades.

The types and intensities or levels of thermal remediations depend on many factors, including the characteristics of the specific device, the ambient temperature or light levels surrounding the device (which may be correlated to the geographic area or the patterns of user behavior, such as typical use inside a brightly lit indoor air conditioned environment or other areas), typical length of time and type of usage by a specific user on a specific device running a specific application, the typical signal strength or type of network experienced by that user, device or application combination for network-intensive applications, or other factors including the type of enclosure the device is in (such as the type of case or lack thereof), or whether or not the user is touching or holding the device.

Embodiments described herein may be configured to track application performance and thermal history and impose remediations before reaching thermal thresholds. This may be done for applications (or other pieces of unique software) that have a history of hitting thermal thresholds that result in nontrivial remediations on a specific device. Such applications may include gaming applications, videoconferencing applications, video capturing or displaying applications or other applications or services that require relatively large amounts of processing or other hardware resource power.

Multiple embodiments are described herein including embodiments that include any one or more of the following: 1) Tracking per-application thermal remediation history, 2) Providing predictions of future thermal remediations based on thermal remediation history and current system state, 3) Utilizing predictions to proactively set thermal remediations, 4) Enabling applications to participate in this process, and 5) Enabling entities outside of the device to participate in this process.

Tracking per-application thermal remediation history may involve portions of software, firmware and/or hardware. These pieces of software, firmware, or hardware may be responsible for tracking thermal remediation history on a per-application basis. Such tracking may identify which thermal remediations were implemented, when they were implemented, how long they were implemented, and the degree to which each remediation was implemented. The thermal remediation tracking module 106 of computer system 101 may perform the tracking using software, firmware and/or hardware. Since storage resources (e.g., main memory or physical storage) are inherently limited, the amount of history stored on the device will be finite.

Thus, elements of history may be deleted or diminished as their value is deemed to be reduced (e.g., by being "old" or no longer relevant). Older data may be moved to external data stores such as storage area networks (SANs) or cloud storage. "Older" elements of history may be replaced with "newer" elements that may be more reflective of the current situation (e.g., typical ambient temperature or brightness, typical usage patterns, typical network signal strength, etc.). Whether an element of history is older or newer may be defined by a user or by software settings.

The thermal remediation information to be stored in the history elements may be polled on a periodic basis or may be triggered by specific events. For example, these events may include changes in thermal remediation level(s), switching applications, starting or stopping specific background activity, docking or undocking the platform, changing the level of battery charging, changing the level of any active cooling, turning the screen on or off, changing screen brightness, entering or exiting specific low power modes, applications requesting specific thermal remediation changes, or other events. In some cases, the events that trigger thermal remediation history tracking may be specified by a user.

The thermal remediation information (e.g. 126 of FIG. 1) may be obtained from pieces of software, firmware, or hardware that is tasked to monitor, observe and/or control thermal remediation activity on a device (e.g. monitored computing device 118). The thermal remediation information and the stored history elements may range in complexity from a single bit of information (e.g., indicating whether thermal remediations engaged or not) to a complex set of information (e.g., the specific levels of thermal remediation for each of a set of hardware components, as generally shown in FIG. 6).

In some embodiments, the history elements may be tagged by a variety of information, including the primary running application (e.g., some set of processes, threads, or tasks associated with a specific activity), any background system activity not associated with the primary running application, any other running applications, any specific phase information about the primary or other applications or background activity, any system state that is relevant (e.g., docking status, charging status, active cooling status, screen status, hardware or firmware or software power modes, application requests, amount of resource consumption by some set of hardware components, etc.), and any other pieces of information that help put the history element into the appropriate context (potentially for later usage). Those portions of information that are highly relevant or most relevant for a given situation may be the portions of information that indicate how the device will react in its current environment, and how the environment will affect the device's ability to dissipate or manage heat.

History elements may be deleted (or not written at all) based on whether or not they meet some set of criteria that determine whether or not the elements will be useful at some later point. For example, if the run time of the application is not sufficient for any thermal remediations to be enabled, the corresponding history element might be discarded or reduced in content level, or the element may be discarded because active cooling was engaged during the corresponding interval of time or point in time, or each of the elements corresponding to a specific application may be discarded if that application is uninstalled or updated with a new version. Other variations are also possible.

Providing predictions of future thermal remediations based on thermal remediation history and current system state may involve portions of software, firmware and/or hardware. These pieces of software, firmware, or hardware may be responsible for utilizing the thermal remediation history elements described above and any relevant system state information to make predictions about which thermal remediations are best suited for the monitored device 118. It should be noted that while the monitored device 118 is shown as being separate from the computer system 101, the computer system 101 may be configured to monitor itself as generally described herein.

Embodiments described herein may exist in the same piece of software, firmware or hardware, or may reside in combinations of these pieces. Such embodiments may incorporate current relevant state information such as the primary running application (e.g., some set of processes, threads or tasks associated with a specific activity), any background system activity not associated with the primary running application, any other running applications, any specific phase information about the primary or other applications or background activity, any system state that is relevant (e.g., docking status, charging status, active cooling status, screen status, hardware or firmware or software power modes, application requests, amount of resource consumption by some set of hardware components, etc.), and other pieces of information that help select the right set of history elements applicable to the current decision. The age of the historical elements may also be considered, as younger elements may be more relevant or applicable. Similarly, elements that have specific times of day, week or year matching the current times of day, week or year may be more relevant than non-matching elements.

As mentioned above, the content of the prediction (e.g. 110 of FIG. 1) may range in complexity from a single bit of information (e.g., engage or disengage thermal remediations) to a complex set of information (e.g., the specific predicted levels of sustainable thermal remediation for each of a set of hardware components). The predictions could be made on a periodic basis or could be triggered by specific events (e.g., changes in thermal remediation level(s), switching applications, starting or stopping specific background activity, docking or undocking the platform, changing the level of battery charging, changing the level of any active cooling, turning the screen on or off or changing its brightness, entering or exiting specific low power modes, applications requesting specific thermal remediation changes, etc.). The result of a prediction (if acted on) may be designed to have multiple positive benefits, such as reducing the possibility of a negative change in user experience at some later point in time, improving battery life, improving overall performance of the system, delaying the point in time or decreasing the impact of a negative change in user experience caused by increasing thermal remediations.

If the amount of historical data for a given application has been deemed insufficient for a decision, or if the decision could be improved by consulting, any information about the application's resource utilization patterns (either obtained through observation, previous analysis, or provided a priori based on application type (e.g. a gaming application or a videoconferencing application)) may be used to find other relevant history elements and incorporate that information into the decision-making process.

Utilizing predictions to proactively set thermal remediations may involve portions of software, firmware and/or hardware. These pieces of software, firmware, or hardware may be responsible for utilizing the predictions generated in the processes described above and any relevant system state information (e.g., thermal sensors) to make changes to the levels of thermal remediations controlled by that piece. The thermal remediations controlled could range in complexity from a single bit of information (e.g., engage or disengage thermal remediations) to a complex set of information (e.g., the specific levels of thermal remediation to engage for each of a set of hardware components). The types of components that may be thermally mitigated may include CPU cores, GPU cores, network controllers, display controllers, embedded controllers or functional units, main memory, storage, I/O interfaces, or other hardware components. The usage of the predictions may be maintained until a new prediction is provided, or their value in deciding appropriate level(s) of mitigation may be degraded over time. The usage of the predictions may be strict or maybe taken as hints, perhaps leaving headroom for those situations where the predictions may not be completely accurate, or providing some level of decreasing remediations over time to see if the predicted sustainable levels were too aggressive.

The resulting settings of thermal remediation levels (by incorporating the predictions) may be designed to have positive benefits, such as reducing the possibility of a negative change in user experience at some later point in time, improving battery life, improving overall performance of the system, or delaying the point in time or decreasing the impact of a negative change in user experience caused by increasing thermal remediations.

Enabling applications to participate in the above-described processes may include having the applications provide hints as to how much processing or other hardware resource power they intend to use for certain tasks. Applications or other uniquely identifiable pieces of software may also participate in the process of thermal remediation decisions by being tagged with identifiers that guide the prediction process. For example, an application with heavy resource utilization and network activity may be tagged in such a way that the prediction mechanism would engage nontrivial thermal remediations even before sufficient application execution history has been gathered.

Similarly, an application may dynamically provide tagging information during its run time, indicating multiple phases of activity levels that occur during its run time. The application tagging may range in complexity from a single bit of information (e.g., heavy vs. light intensity application) to a complex set of information (e.g., the specific levels of thermal remediation to engage for each of a set of hardware components or the specific levels of utilization expected for different hardware components). The types of components may include CPU cores, GPU cores, network controllers, display controllers, embedded controllers or functional units, main memory, storage, I/O interfaces, etc. Applications that desire the highest levels of performance (e.g., benchmarking application or games) may specify tags that would inform the systems and processes described above to avoid engaging the thermal remediations or reducing the degree to which the remediations are engaged, even if that means that the likelihood of future thermal mitigations increases. Applications may be notified of the predictions (i.e., future levels) and/or current levels of thermal remediations so that they could adjust their own behavior appropriately to make the best use of the resources that are currently available.

Enabling entities outside of the device to participate in this process may involve third parties such as data or service providers. Software, firmware, or hardware outside of the systems described herein may also participate in the prediction process. Thermal remediation history information may be passed to an outside entity for example. The outside entity may include in its analysis other information that puts the historical information into context, such as the specifics of each system (e.g., manufacturer and model number), the geographical location or weather condition of each system, the characteristics of the workloads run on each system, etc. The outside entity may analyze the information collected from one or more monitored computer systems (e.g. 118 of FIG. 1) to provide predictions before actual runtime of an application or other uniquely identifiable piece of software. The outside entity may provide its analysis or predictions to systems either periodically or at certain events (e.g., during creation of the system at the factory, when a user first uses the system, when updates are downloaded to that system, when an application is installed, when the user changes geographical region, when weather conditions change, etc).

In one embodiment, a resource manager and a power manager may be implemented. A state machine within the resource manager may have a set of heuristics and algorithms that are used to predict future situations where it is likely that nontrivial thermal remediations are going to kick in and thereby reduce performance in a manner that could significantly damage the user experience. This state machine may be fed by several sources: application state data that indicates which applications are active in the foreground or background, indications of whether the screen on or off, whether the system in connected standby, whether any of the applications have requested a sustained thermal mode, etc. At least in some cases, the resource manager may have access to such information and provide it to the state machine. The data may, for example, include an array of percentages. For instance, one data element may be the percentage of frequency throttling that has been engaged for the CPU cores.

Per-application thermal histories (PATHs) describe the thermal histories of those applications that have been run for a sustained duration at least once since being installed, or from per-application information obtained from an entity outside of the device. The histories, including data arrays of thermal remediation percentages, may be used to compute the likely future levels of thermal remediations that should be engaged to create the best user experience. PATH data may be updated periodically or at the time of specific events (e.g., upon changes in thermal remediation levels, switching away from an application, upon engaging a hardware dock or active cooling) by calling a method that is configured to retrieve thermal remediation states and store them in an array of thermal remediation percentages, keyed by the application responsible for engaging the thermal remediations. PATHs may additionally be keyed by environmental factors including geographical location, weather conditions, dock/undock state, etc.) In some cases, mechanisms may be implemented to keep PATH at a reasonable size, by removing data that is stale, allowing headroom so that if the typical environment has changed, the hint levels can be relaxed, etc. The determination of which application is designated as "responsible" may be based on multiple factors (e.g., what application is in the foreground, how much and what type background activity is going on, etc.).

The state machine may also parse the PATH data for a given application when it is started (and possibly when it is switched to). The state machine may generate a proposed array of thermal remediation percentages suitable for passing via a method configured to set thermal remediation hints. Application programming interfaces (APIs) may also be implemented for polling and/or hinting hardware thermal remediation engine state information and crafting an appropriate internal mapping to other application methods. These APIs may further allow a resource manager to poll or be informed of specific thermal environmental changes such as hard docking engage/disengage, active cooling (for hybrid designs) engage/disengage, or other changes.

The power manager may be responsible for managing the levels of thermal remediation for any components that have exposed cooling algorithms or thermal zones. As thermal thresholds are reached for one or more thermal sensors, the power manager may engage code specific to each related hardware component. As such, the power manager may become aware of the level of hardware remediations for a set of components that have given appropriate control. As such, algorithms or application functions may be implemented to select thermal remediation levels on a component by component basis. Hints may be provided to those algorithms regarding upcoming application processing behaviors. The hints may take the form of an array of suggested thermal remediation levels (percentages). At least in some cases, the most current previous hint(s) from the resource manager may be maintained as an algorithmic input until the next hint is received.

In order for the resource manager to identify appropriate hints, it may occasionally poll a monitored device (e.g. 118) for its current thermal remediation levels. The expected timeframe may be minutes or seconds, or may even be dynamic or be set differently for different platforms based on their thermal characteristics (e.g., for a cheaper platform that heats up quickly under sustained load). If a hardware thermal remediation engine is available, hardware providers may provide an API that allows the monitored device to notify it when a period of sustained activity is upcoming, such that the hardware thermal remediation engine can moderate resource utilization before the actual activity trips the thermal thresholds.

In some embodiments, another API may be created that allows a thermal remediation engine to send its thermal remediation levels to the resource manager in a manner similar to that of the monitored device 118. Assuming the data followed a similar or equivalent format as that coming from the monitored device, the resource manager may perform a similar process of preparing hints to send to the thermal remediation engine. Note that the resource manager may not need to actually know what the individual thermal remediation levels correspond to specific hardware or firmware components. Rather, the resource manager may perform its prediction based on the history of each level in the array provided by the thermal remediation engine.

For certain applications, such as compute-intensive and/or network-intensive games, there is a possibility that thermal thresholds may be hit during the course of gameplay, with the net result being a sudden drop in performance and therefore an unpleasant user experience due to the implementation of thermal remediations. By tracking the thermal remediation history of such scenarios, an appropriate set of thermal remediations may be put into place before thermal thresholds are hit. Not only does this reduce the possibility of a sudden performance drop, but it may also result in a higher level of performance as less dramatic remediations are implemented. These concepts will be explained further below with regard to methods 200, 300 and 400 of FIGS. 2, 3 and 4, respectively.

Figure 2:
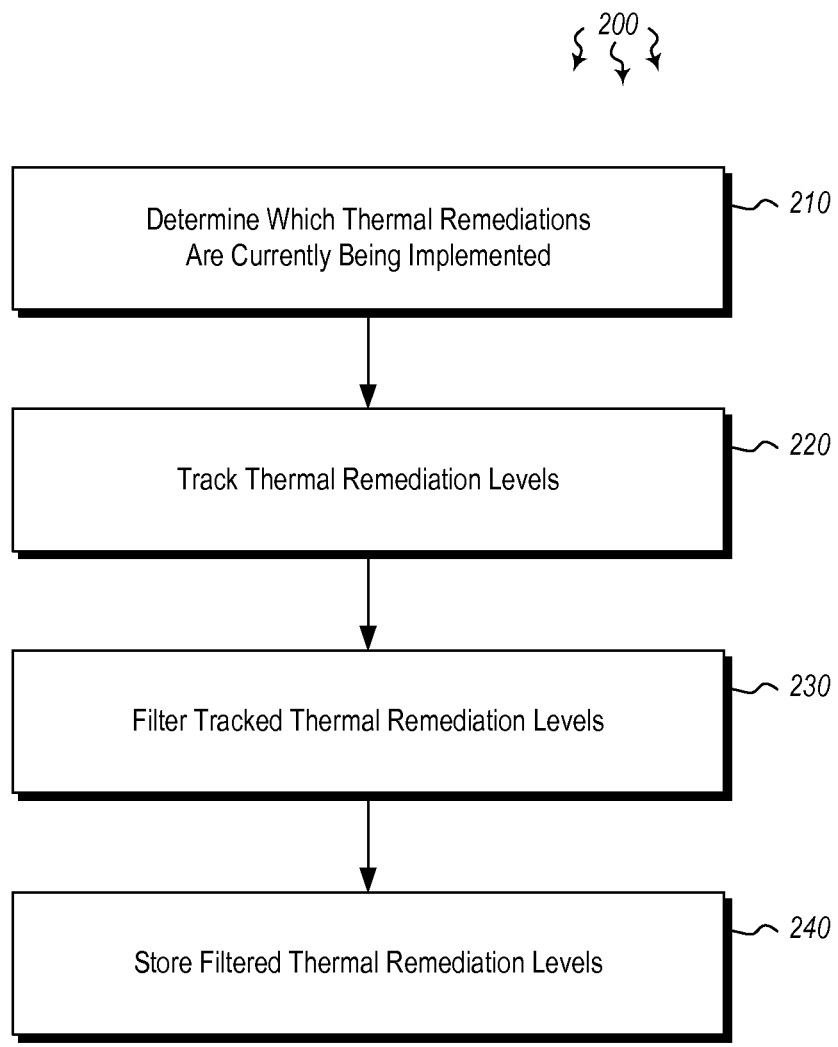
FIG. 2 illustrates a flowchart of an example method for capturing and storing historical data regarding thermal remediations.

FIG. 2 illustrates a flowchart of a method 200 for capturing and storing historical data regarding thermal remediations. The method 200 will now be described with frequent reference to the components and data of environment 100.

Method 200 includes determining which thermal remediations are currently being implemented on a monitored computing device, the thermal remediations being based on the monitored computing device's current operating environment (210). For example, determining module 105 of computer system 101 may determine which thermal remediations 126 are being implemented on monitored computing device 118. As indicated above, thermal remediations 126 may be any actions taken by a device to cool the device or reduce further heating of the device or reduce the rate of further heating. The monitored computing device 118, like computer system 101, may be any type of computing device including a phone, laptop, desktop, tablet, wearable device, server, or any other devices with electronic components in them including televisions, cable or satellite tv boxes, networking equipment such as routers and firewalls, DVD players, stereo equipment, etc. Indeed, it will be understood that the principles and embodiments described herein may be applied to any device or system that incorporates electronics and has the potential to overheat. Moreover, it will be understood that, although shown as separate devices in FIG. 1, the computing system 101 may monitor itself and, thus, computer system 101 may itself be the monitored device.

The thermal remediations 126 may include any one or more of the following: reducing CPU or other hardware component clock frequencies, moving work items between CPU cores, dimming a display, preventing a battery from charging, reducing transmission rates on a network card, disabling antennas, disabling ports, reducing camera frame rates, reducing camera resolution, changing hardware component or platform idle states, or taking other measures to reduce the activity of hardware components so as to reduce heat. The "current operating environment", as the term is used herein (e.g. element 127 in FIG. 1), includes the physical thermal environment and/or the current software execution environment.

As such, the current operating environment may include a picture or indication of what is occurring on each (or at least some) of the device's hardware components. The current operating environment may also include a picture or indication of which applications, services and/or processes are being executed (or were recently executed) on the monitored device. Additionally or alternatively, the computing device's current operating environment 127 may include indications of ambient temperature and brightness, whether a user is actively using the system, whether a display screen is on, whether a graphics processing unit (GPU) or other hardware component is on, whether antennas are on, as well as the level at which each component is operating (i.e. high load or low load).

Method 200 further includes tracking thermal remediation levels for those thermal remediations that are currently being implemented on the monitored computing device, the thermal remediation levels indicating the degree to which each thermal remediation is implemented (220). The thermal remediation tracking module 106 of computer system 101 may track thermal remediation levels 116 which may be transmitted to the computer system 101 as part of tracking data 115. The thermal remediation levels 116 may indicate the degree to which each thermal remediation is being implemented on the monitored device 118.

As shown in FIG. 6, many different types of thermal remediations 601 may be implemented. Each thermal remediation type 602 may have a corresponding level of implementation 603. The level of implementation may be shown on a scale of 1-10 (as shown in FIG. 6) or may be shown by a bar graph or other means of conveying the degree of implementation. On the scale of 1-10, a 1 may indicate that that particular thermal remediation type is not implemented at all, or is only very lightly implemented. On the other hand, a 9 or 10 may indicate that a given thermal remediation is fully or nearly fully implemented. Thus, for example, as shown in FIG. 6, because the level of implementation for "reducing camera frame rates" is at a 9, camera frame rates have been severely reduced for that monitored device. Meanwhile, as reducing "data transmission rates" and "disabling antennas" are both at level 1, they either have not been implemented or are only minimally implemented. Implementation of thermal remediations may be performed at substantially any level, and the levels may be divided into less granular divisions (e.g. high, medium and low) or more granular divisions (e.g. an implementation scale of 1-100). Moreover, it will be understood that each thermal remediation type 602 may have its own, individually adjustable level of implementation.

Returning to FIG. 2, method 200 next includes filtering the tracked thermal remediation levels for those portions of tracked thermal remediation information that include the most relevant information regarding the monitored computing device's current operating environment (230). For example, filtering module 107 of computer system 101 may filter the tracked thermal remediation levels 116 (603 of FIG. 6) to identify those pieces of thermal remediation information that are the most relevant regarding the monitored computing device's current operating environment 127. This filtering may be unique to each monitored device, as each device may have different components, may be in a different ambient temperature or brightness, may be processing different applications, may have differently implemented settings (e.g. screen brightness settings), or other factors may be contributing to each monitored device. As such, the thermal remediation information that is most relevant to each device may be unique or substantially unique.

The monitored computing device 118 of FIG. 1 includes multiple hardware and software components. Not all of these components will be present on each type of monitored computing device (or additional components may be present). Device 118 includes a hardware processor 119, memory 120, antennas 121 such as WiFi, Bluetooth, CDMA, GPS, etc., a battery 122, a display 123 which may be a touchscreen or other type of display, data storage 124 such as flash memory, magnetic storage or disc-based optical storage, an operating system 125 and applications 129 installed thereon. Because each monitored device has its own set of hardware, applications, settings, usage patterns and physical environment (e.g. temperature and humidity), the filtered set of thermal remediation information that is most relevant to that monitored device is likely different from all other devices.

The filtered set of thermal remediation information that is most relevant to the monitored device 118 may include information indicating those thermal remediations that are the most effective at reducing the temperature of the device while still providing adequate functionality (i.e. without substantially reducing user experience). Knowing which thermal remediations are being implemented and the degree to which they are being implemented may allow for changes to be implemented which improve processing performance while reducing the temperature of the device and thereby conserving the life of the device. By identifying the remediations that are most relevant to the computing device's current operating environment, the level of those remediations may be increased or decreased to reduce the temperature of the device, and thereby increase processing speed and hardware component performance.

Method 200 also includes storing the filtered thermal remediation levels in a data store (240). For instance, the filtered thermal remediation levels 113 may be stored in data store 112. The data store 112 may be external to or internal to computer system 101. The data store 112 may be any type of local or distributed storage including a storage area network (SAN) or cloud storage. In some cases, the determining module 105 of computer system 101 may determine whether the thermal remediation data is obtained by an operating system (OS) or by computer system hardware. For instance, the thermal remediation level data 116 may be obtained by operating system 125 or by hardware or firmware on the monitored computer system 118. This thermal remediation data may be stored on the data store 112 until it is determined to be no longer relevant. At that point, it may be manually or automatically deleted.

For example, when an application is deleted from the monitored device or no longer used, thermal remediation data related to the execution of that application could be considered obsolete and may be deleted. In some cases, the stored thermal remediation levels 113 may be indexed by application name or by application type, so that when applications are deleted or no longer used, a user or a software maintenance module 130 may easily pick out the data corresponding to those applications and remove it. Moreover, indexing the information by application name or application type may allow users (or the prediction generating module 109) to determine which thermal remediations are most effective at reducing device temperature while only providing minimal intrusions onto the user experience.

Figure 3:
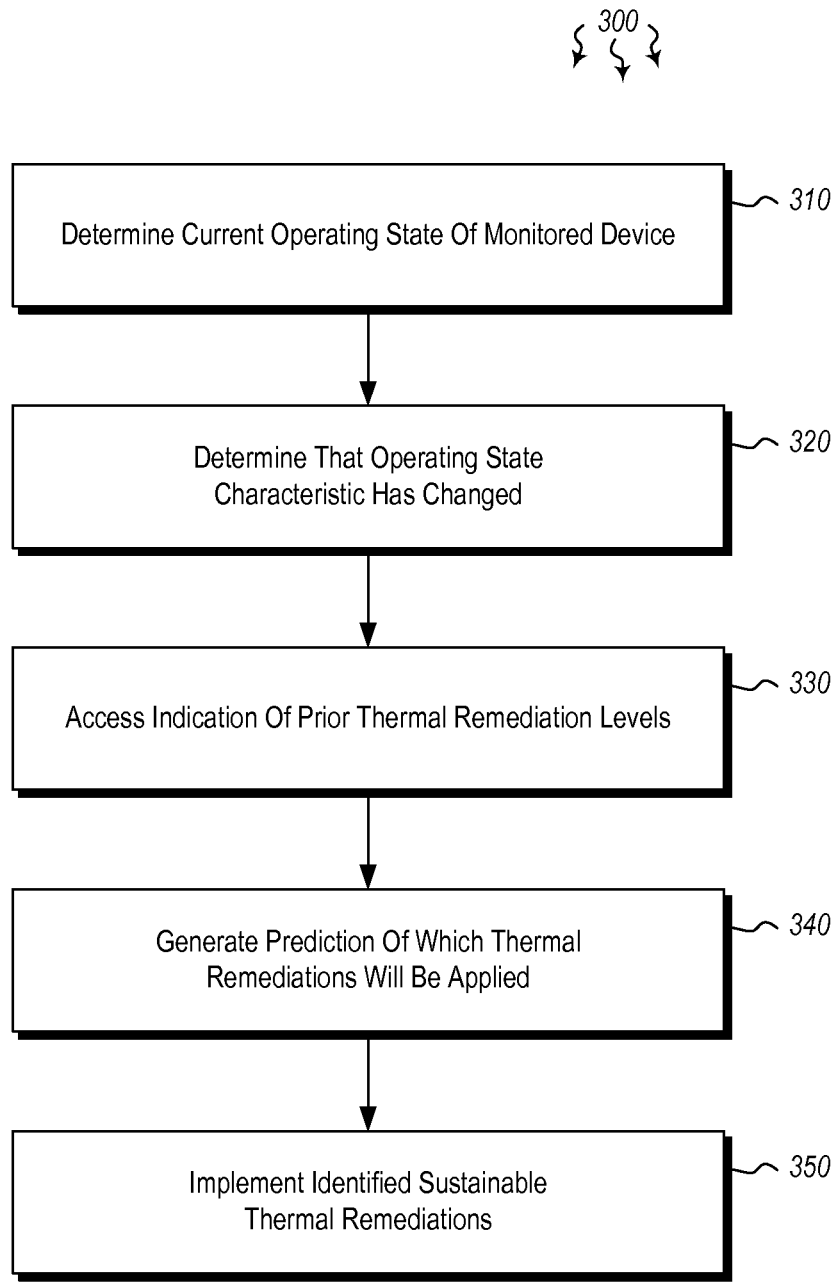
FIG. 3 illustrates a flowchart of an example method for predicting and acting on remediation futures.

Turning now to FIG. 3, a flowchart is illustrated of a method 300 for predicting and acting on remediation futures. The method 300 will now be described with frequent reference to the components and data of environment 100.

Method 300 includes determining current operating state of a monitored computing system (310). The determining module 105 of computer system 101 may determine the current operating state 127 of monitored computer system 118. As above, the current operating state may include the device's physical surroundings, as well as indications of currently executing applications and currently operating hardware or firmware components. The determining module 105 may also determine that at least one operating state characteristic 128 has changed on the monitored computing system (320). An operating state characteristic may include any type of setting change, application execution change, hardware or firmware component operating change, physical environment change or other change that would affect any part of the monitored device's current operating state 127.

In some cases, determining that at least one operating state characteristic has changed on the monitored computing system is initiated based on the occurrence of a specified event, or based on polling. For example, an event may occur such as an increase in device temperature that causes the thermal remediation tracking module 106 to determine whether (other) operating state characteristics have changed. Alternatively, the tracking module 106 may be configured to poll the monitored device 118 on a periodic basis to determine whether any operating state characteristics have changed.

Method 300 further includes accessing an indication of prior thermal remediation levels, the prior thermal remediation levels indicating the degree to which each thermal remediation was implemented (330). The accessing module 108 of computer system 101 may access an indication of prior thermal remediation levels 114 (i.e. per-application thermal histories (PATHs) described above). These prior thermal remediation levels 114 indicate the level or degree to which each thermal remediation was implemented on the monitored device 118. The prediction generating module 109 may generate a prediction 110 of which thermal remediations will be applied in reaction to the change in operating state characteristics of the computing system (340). This prediction may be dynamically updated based on one or more events occurring. The events may indicate that an application is about to be executed, or that a large amount of data is about to be transmitted, or that a processing-intense game is about to be run.

The prediction 110 is based on prior thermal remediation levels (i.e. what happened last time this event occurred). The prediction thus shows which thermal remediations will be implemented as a result of the event (e.g. the initiating of a high-resolution game). The prediction may be different than what was previously observed (e.g., in PATHs), because applying thermal remediations earlier (i.e., before a thermal threshold event occurs) may result in a different steady-state equilibrium between performance and temperature, or extend the amount of time before a thermal threshold event occurs after sustained application execution. Thus the prediction 110 may involve more than just replicating previous thermal remediation levels.

In some embodiments, heuristics may be used to analyze the thermal remediation history 114 and predict future behavior regarding thermal remediations. The heuristics may analyze many different processes, services, hardware interactions and other components that are involved in the performance of a device function, and may learn over time how the devices respond, thus identifying which thermal remediations are implemented as a result of certain stimuli. This generated prediction may be a single bit of information, indicating that thermal remediations are to be increased or decreased, or may include more complex or detailed information identifying thermal remediations for many different pieces of hardware that are to be throttled in a specific way or to a specific degree based on the generated predictions.

Method 300 also includes implementing one or more sustainable thermal remediations identified in the generated prediction (350). The thermal remediation implementing module 111 may implement the thermal remediations identified in the prediction 110. These remediations may be implemented by the operating system 125 of the monitored computing device 118, or may be implemented by hardware or firmware components of the monitored device 118 based on the generated prediction. Implementing the thermal remediations 126 based on the generated prediction 110 may include changing the applied level of any one or more of the thermal remediations (e.g. 603 of FIG. 6) on the monitored computing device. At least in some embodiments, the thermal remediations 126 may be implemented before allowable temperatures on the monitored computing system 118 are exceeded. Thus, in this manner, overheating may be predicted and prevented by implementing the thermal remediations before the device's active cooling features kick in.

When determining which level changes to make to the thermal remediations, the most recent monitored computing device usage may be given more weight when generating the prediction 110 of which thermal remediations are to be applied. As such, applications that have been executed more recently, or other functions that have been performed more recently may be given more weight when generating and acting on the prediction 110.

Figure 4:
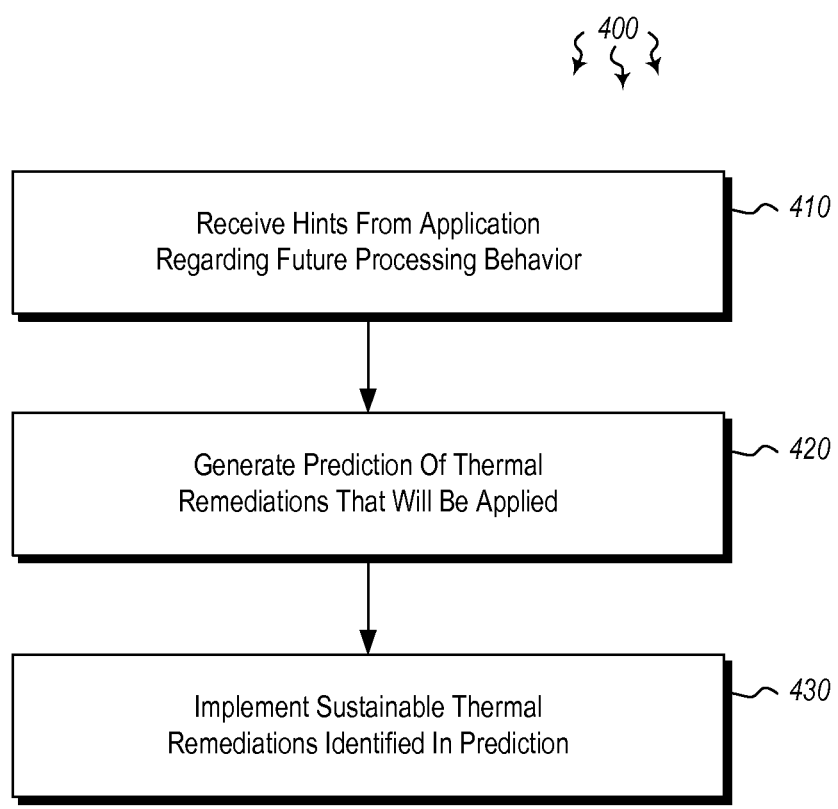
FIG. 4 illustrates a flowchart of an example method for communicating with applications regarding thermal remediations implemented on the computer system.

FIG. 4 illustrates a flowchart of a method 400 for communicating with applications regarding thermal remediations implemented on the computer system. The method 400 will now be described with frequent reference to the components and data of environment 100.

Method 400 includes receiving one or more hints from an application running on the computer system, the hints providing an indication of the application's future processing behavior (410). The prediction generating module 109 of computer system 101 may receive hints 117 from an application running on the monitored computing device 118, where the hints provide an indication of the application's future processing behavior. Applications 129 (or other services or software functions) may have an idea of the amount of processing, storage, memory or other resources they will need to function properly. For example, some applications such as video conferencing applications use a burst of processing up front to establish the connection, but less later on, while other applications use a steady amount of processing and other resources. These applications may be able to provide hints 117 to the prediction generating module 109 so that it will know what is about to occur on the monitored device 118.

Figure 5:
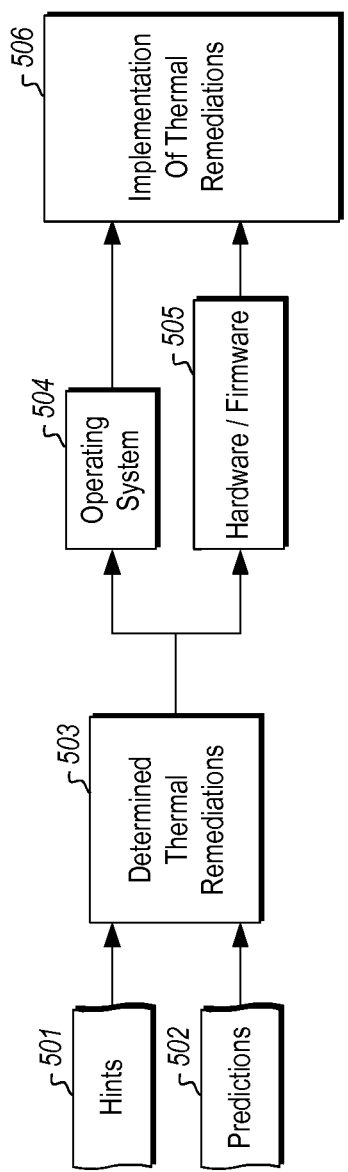
FIG. 5 illustrates an embodiment in which thermal remediations are implemented by an operating system, by hardware or firmware, or by a combination of both.

Method 400 includes generating a prediction indicating which thermal remediations will be applied in reaction to the received hints indicating the application's future processing behavior (420). Thus, the prediction generating module 109 can use the received hints to generate prediction 110 regarding future hardware, software and firmware usage on the monitored device 118. Once the prediction has been generated, the thermal remediation implementing module 111 may implement the sustainable thermal remediations identified in the generated prediction (430). As shown in FIG. 5, hints 501 and predictions 502 may each go into a determination of which thermal remediations 503 will be selected for a given device in a given situation, based on the device's current operating environment 127. Once the thermal remediations 503 have been identified, the operating system 504 may implement the thermal remediations 506, the device's hardware/firmware 505 may implement the thermal remediations 506, or a combination of the operating system 504 and hardware/firmware 505 may implement the thermal remediations 506.

In some embodiments, the computer system 101 may send data such as hints back to the applications 129 running on the monitored computing device 118. These hints may indicate which thermal remediations are going to be implemented on the monitored device. As such, the application may be able to respond to the data and modify its execution in some manner. For instance, the application may modify its execution behavior to compensate for a lower CPU frequency or for lower data transmission rates, etc. The hints sent to the application may indicate to the application how the thermal remediations will be implemented and the degree to which the thermal remediations will be implemented, allowing the application to respond accordingly. Hints regarding the environment of the monitored computer system may be provided by an external entity such as a third party entity.

Still further, operating information may be passed to a cloud service which generates the prediction of which thermal remediations will be applied in reaction to the received hints indicating the application's future processing behavior. Thus, a cloud service may be implemented to generate the prediction which is then implemented on the monitored computing device 118. These thermal remediations may be implemented before the monitored computer system hits any predefined thermal thresholds. As such, thermal remediations may be implemented in a measured fashion, prior to the device overheating, allowing both applications and hardware to compensate for the actions taken by the thermal remediations. In this manner, the monitored device may provide enhanced performance for users while reducing the power draw of the hardware components.

Claims support: One embodiment describes a method, implemented at a computer system that includes at least one processor, for capturing and storing historical data regarding thermal remediations. The method includes: determining which thermal remediations 126 are currently being implemented on a monitored computing device 118, where the thermal remediations are based on the monitored computing device's current operating environment 127, tracking thermal remediation levels 116 for those thermal remediations 126 that are currently being implemented on the monitored computing device 118, where the thermal remediation levels indicate the degree to which each thermal remediation is implemented, filtering the tracked thermal remediation levels for those portions of tracked thermal remediation information that include information regarding the monitored computing device's current operating environment 127, and storing the filtered thermal remediation levels 113 in a data store 112.

In some cases, the thermal remediations include at least one of the following: reducing CPU clock frequencies, moving work items between CPU cores, dimming a display, preventing a battery from charging, reducing transmission rates on a network card, disabling antennas, disabling ports, reducing camera frame rates, reducing camera resolution, or changing hardware component or platform idle states. The method also includes determining whether the thermal remediation data is obtained by an operating system (OS) or by computer system hardware.

In another embodiment, a computer program product is provided. The computer program product implements a method for predicting and acting on thermal remediation futures. The computer program product comprises one or more computer-readable storage media having stored thereon computer-executable instructions that, when executed by one or more processors of a computing system, cause the computing system to perform the method, the method comprising: determining current operating state 127 of a monitored computing system 118, determining that at least one operating state characteristic 128 has changed on the monitored computing system 118, accessing an indication of prior thermal remediation levels 114, the prior thermal remediation levels indicating the degree to which each thermal remediation 126 was implemented, generating a prediction 110 of which thermal remediations will be applied in reaction to the change in operating state characteristics 128 of the monitored computing system 118, and implementing one or more sustainable thermal remediations identified in the generated prediction 110.

In some cases, implementing thermal remediations based on the generated prediction includes changing the applied level of one or more thermal remediations on the monitored computing system. Determining that at least one operating state characteristic has changed on the monitored computing system occurs based on polling, or based on the occurrence of a specified event. Heuristics are used to analyze thermal remediation history and predict future behavior regarding thermal remediations. The operating system of the monitored computing system implements the one or more thermal remediations based on the generated prediction. The generated prediction is dynamically updated based on one or more events occurring. Portions of computing system hardware or firmware implement the thermal remediations based on the generated prediction. The generated prediction includes information indicating thermal remediations for a plurality of pieces of hardware that are to be throttled in a specific way based on the generated predictions. The sustainable thermal remediations are applied before allowable temperatures on the monitored computing system are exceeded.

In another embodiment, a computer system is provided which includes the following: one or more processors 102, a receiving module 104 for receiving one or more hints 117 from an application 129 running on a monitored computer system 118, the hints providing an indication of the application's future processing behavior, a prediction generating module 109 for generating a prediction 110 indicating which thermal remediations 126 will be applied in reaction to the received hints indicating the application's future processing behavior, and a thermal remediation implementing module 111 for implementing one or more sustainable thermal remediations identified in the generated prediction 110.

The computer system further sends portions of information back to application indicating which thermal remediations are going to be implemented, and the portions of information indicate to the application how the thermal remediations will be implemented and the degree to which the thermal remediations will be implemented, allowing the application to respond accordingly.

Thus, methods, systems and computer program products are provided which capture and store historical data regarding thermal remediations. Moreover, methods, systems and computer program products are provided which predict and act on remediation futures and which communicate with applications regarding thermal remediations implemented on the computer system.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer program product comprising one or more hardware storage devices having stored thereon computer-executable instructions that, when executed by one or more processors of a computing system, cause the computing system to predict and act on thermal remediation futures, the computer-executable instructions including instructions that are executable to cause the computing system to at least:

determine one or more current operating state characteristics of a monitored computing system;

track thermal remediation information of the monitored computing system, the tracking thermal remediation information comprising tagging at least one running application with thermal remediation information including at least one of (1) information indicating at least one of a plurality of phases of activity levels that occur during runtime of the at least one running application, (2) information indicating thermal intensity of the at least one running application, (3) information indicating at least a level of thermal remediation to engage for at least one hardware component during runtime of the at least one running application, or (4) information indicating at least a level of utilization for at least one hardware component during runtime of the at least one running application;

determine that at least one operating state characteristic has changed on the monitored computing system, including determining that a particular software is now executing at the monitored computer system; and based on an identity of the particular software that is now executing at the monitored computing system, proactively prevent a thermal threshold from being reached due to execution of the particular software, including:

accessing the tracked thermal remediation information, including accessing thermal history of one or more implemented thermal remediations being tagged by the particular software;

accessing information related to a current system state, including accessing one or more thermal remediation levels currently implemented at the monitored computer system, the one or more thermal remediation levels indicating a first degree to which one or more thermal remediations were currently implemented;

based on the tracked thermal remediation information and the information related to the current system state, generating a prediction of a second degree to which the one or more thermal remediations could be implemented in reaction to execution of the particular software, in order to prevent the thermal threshold from being reached due to execution of the particular software; and implementing the second degree of the one or more thermal remediations identified in the generated prediction to reduce heating of the monitored computing system, thereby preventing the thermal threshold from being reached due to execution of the particular software, wherein the implementing the second degree of the one or more thermal remediations includes at least reducing a CPU clock frequency.

2. The computer program product of claim 1, wherein implementing one or more thermal remediations based on the generated prediction comprises changing an applied level of one or more thermal remediations on the monitored computing system.

3. The computer program product of claim 1, wherein determining that at least one operating state characteristic has changed on the monitored computing system occurs based on polling or based on an occurrence of a specified event.

4. The computer program product of claim 1, wherein heuristics are used to analyze thermal remediation history and predict future behavior regarding thermal remediations.

5. The computer program product of claim 1, wherein an operating system of the monitored computing system implements the one or more thermal remediations based on the generated prediction.

6. The computer program product of claim 1, wherein the generated prediction is dynamically updated based on one or more events occurring.

7. The computer program product of claim 1, wherein one or more portions of computing system hardware or firmware implement the one or more thermal remediations based on the generated prediction.

8. The computer program product of claim 1, wherein the generated prediction is a single bit of information, indicating that thermal remediations are to be increased or decreased.

9. The computer program product of claim 1, wherein the generated prediction comprises information indicating thermal remediations for a plurality of pieces of hardware that are to be throttled in a specific way based on the generated predictions.

10. The computer program product of claim 1, wherein the second degree of the one or more thermal remediations are applied before allowable temperatures on the monitored computing system are exceeded.

11. The computer program product of claim 1, wherein the one or more thermal remediations include one or more of the following: reducing a CPU clock frequency, moving a work item between CPU cores, display dimming, reducing a data transmission rate, disabling an antenna, disabling a port, reduce a camera frame rate, or changing an idle state.

12. A method, implemented at a computer system that includes one or more processors, for acting on thermal remediation futures, the method comprising:

determining one or more current operating state characteristics of a monitored computing system;

tracking thermal remediation information of the monitored computing system, the tracking thermal remediation information comprising tagging at least one running application with thermal remediation information including at least one of (1) information indicating at least one of a plurality of phases of activity levels that occur during runtime of the at least one running application, (2) information indicating thermal intensity of the at least one running application, (3) information indicating at least a level of thermal remediation to engage for at least one hardware component during runtime of the at least one running application, or (4) information indicating at least a level of utilization for at least one hardware component during runtime of the at least one running application;

determining that at least one operating state characteristic has changed on the monitored computing system, including determining that a particular software is now executing at the monitored computer system; and based on an identity of the particular software that is now executing at the monitored computing system, proactively preventing a thermal threshold from being reached due to execution of the particular software, including:

accessing the tracked thermal remediation information, including accessing thermal history of one or more implemented thermal remediations being tagged by the particular software;

accessing information related to a current system state, including accessing one or more thermal remediation levels currently implemented at the monitored computer system, the one or more thermal remediation levels indicating a first degree to which one or more thermal remediations were currently implemented;

based on the tracked thermal remediation information and the information related to the current system state, generating a prediction of a second degree to which the one or more thermal remediations could be implemented in reaction to execution of the particular software, in order to prevent the thermal threshold from being reached due to execution of the particular software; and implementing the second degree of the one or more thermal remediations identified in the generated prediction to reduce heating of the monitored computing system, thereby preventing the thermal threshold from being reached due to execution of the particular software, wherein the implementing the second degree of the one or more thermal remediations includes at least reducing a CPU clock frequency.

13. The method of claim 12, wherein implementing one or more thermal remediations based on the generated prediction comprises changing an applied level of one or more thermal remediations on the monitored computing system.

14. The method of claim 12, wherein determining that at least one operating state characteristic has changed on the monitored computing system occurs based on polling or based on an occurrence of a specified event.

15. The method of claim 12, wherein heuristics are used to analyze thermal remediation history and predict future behavior regarding thermal remediations.

16. The method of claim 12, wherein an operating system of the monitored computing system implements the one or more thermal remediations based on the generated prediction.

17. The method of claim 12, wherein the generated prediction is dynamically updated based on one or more events occurring.

18. The method of claim 12, wherein one or more portions of computing system hardware or firmware implement the one or more thermal remediations based on the generated prediction.

19. The method of claim 12, wherein the one or more thermal remediations include one or more of the following: reducing a CPU clock frequency, moving a work item between CPU cores, display dimming, reducing a data transmission rate, disabling an antenna, disabling a port, reduce a camera frame rate, or changing an idle state.

20. A computer system comprising:
- at least one processor; and
- at least one computer-readable media having stored thereon computer-executable instructions that, when executed by the at least one processor, cause the computer system to predict and act on thermal remediation futures, the computer-executable instructions including instructions that are executable to cause the computer system to at least:
  - determine one or more current operating state characteristics of a monitored computing system;
  - track thermal remediation information of the monitored computing system, the tracking thermal remediation information including tagging at least one running application with thermal remediation information including at least one of (1) information indicating at least one of a plurality of phases of activity levels that occur during runtime of the at least one running application, (2) information indicating thermal intensity of the at least one running application, (3) information indicating at least a level of thermal remediation to engage for at least one hardware component during runtime of the at least one running application, or (4) information indicating at least a level of utilization for at least one hardware component during runtime of the at least one running application;
  - determine that at least one operating state characteristic has changed on the monitored computing system, including determining that a particular software is now executing at the monitored computer system; and
  - based on an identity of the particular software that is now executing at the monitored computing system, proactively prevent a thermal threshold from being reached due to execution of the particular software, including:
    - accessing the tracked thermal remediation information, including accessing thermal history of one or more implemented thermal remediations being tagged by the particular software;
    - accessing information related to a current system state, including accessing one or more thermal remediation levels currently implemented at the monitored computer system, the one or more thermal remediation levels indicating a first degree to which one or more thermal remediations were currently implemented;
    - based on the tracked thermal remediation information and the information related to the current state, generating a prediction of a second degree to which the one or more thermal remediations could be implemented in reaction to execution of the particular software, in order to prevent the thermal threshold from being reached due to execution of the particular software; and
    - implementing the second degree of the one or more thermal remediations identified in the generated prediction to reduce heating of the monitored computing system, thereby preventing the thermal threshold from being reached due to execution of the particular software, wherein the implementing the second degree of the one or more thermal remediations includes at least reducing a CPU clock frequency.

* * * * *